US006507856B1

(12) United States Patent
Chen et al.

(10) Patent No.: US 6,507,856 B1
(45) Date of Patent: Jan. 14, 2003

(54) DYNAMIC BUSINESS PROCESS AUTOMATION SYSTEM USING XML DOCUMENTS

(75) Inventors: Shyh-Kwei Chen, Chappaqua, NY (US); Jen-Yao Chung, Yorktown Heights, NY (US); Mitchell A. Cohen, Yorktown Heights, NY (US); Shiwa S. Fu, Bedford Hills, NY (US); Vibby Gottemukkala, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,814

(22) Filed: Jan. 5, 1999

(51) Int. Cl.[7] .......................... G06F 17/30; G06F 7/00; G06F 17/00

(52) U.S. Cl. .............................. 707/513; 707/1; 707/2; 707/3; 707/10; 707/104.1

(58) Field of Search ................................ 707/513, 500, 707/75, 1, 2, 3, 10, 104.1

(56) References Cited

U.S. PATENT DOCUMENTS

| | | | | | |
|---|---|---|---|---|---|
| 5,835,712 | A | * | 11/1998 | DuFresne | 707/10 |
| 6,108,673 | A | * | 8/2000 | Brandt et al. | 707/505 |
| 6,112,242 | A | * | 8/2000 | Jois et al. | 709/225 |
| 6,125,391 | A | * | 9/2000 | Meltzer et al. | 709/223 |
| 6,208,986 | B1 | * | 3/2001 | Schneck et al. | 707/3 |
| 6,216,121 | B1 | * | 4/2001 | Klassen | 707/1 |

* cited by examiner

*Primary Examiner*—Joseph H. Feild
*Assistant Examiner*—Rachna Singh
(74) *Attorney, Agent, or Firm*—F. Chau & Associates, LLP

(57) ABSTRACT

A system for exchanging and merging messages over a network includes a server accessible by a plurality of remote browsers for transmitting a template including fields for information entry and a business system accessible by the server for generating a return document pursuant to information entered in the template on the browsers. The business system includes a first parser for receiving a document from a browser, the document including information about data characteristics of information entered into the template, and a second parser for receiving information about data characteristics to provide a return template. A merging algorithm is implemented to merge the document with the return template for providing a return document to the browser having portions of the return template with data entered therein.

12 Claims, 12 Drawing Sheets

```
<PurchaseOrder>
  <PONumber> 1200 </PONumber>   <Purpose> Original </Purpose>
  <Date> 980116</Date>          <Type> Stand-alone Order </Type>
  <LineItem>
    <ItemNO> 0001 </ItemNO>    <Quantity> 1 </Quantity>
20  <Unit> Box </Unit>         <UnitPrice> 5.29 </UnitPrice>
    <ProductService>
      <ServiceID> 79845 </ServiceID>
      <ServiceDescription> Vendor (Sellers) Part Number </ServiceDescription>
    </ProductService>
    <ProductService>
      <ServiceID> 0 </ServiceID>
      <ServiceDescription> Purchase Item Code </ServiceDescription>
    </ProductService>
    <ProductDescription>          <Format> Free </Format>
      <Description> 01Bussiness Cards </Description>
    </ProductDescription>
    <ProductDescription>          <Format> Free </Format>
      <Description> 02Research Staff Member, Manager </Description>
    </ProductDescription>
    <Address>
       <Party> Ship To </Party> <Name> IBM TJ Watson Research Center </Name>
       <Street> PO Box 704 (Hawthorne) </Street> <City> Yorktown Heights </City>
       <State> NY </State> <ZipCode> 10598 </ZipCode>
    </Address>
  </LineItem>
  <LineItem>
    <ItemNO> 0002 </ItemNO>    <Quantity> 20 </Quantity>
25  <Unit> Case </Unit>        <UnitPrice> 20.00 </UnitPrice>
  </LineItem>
  <Address>
     <Party> Bill-to-Party <Name> IBM Corporation </Name>
21   <AdditionalName> Account Payable </AdditionalName>
     <Street> PO Box 9005 </Street> <City> Endicott </City>
     <State> NY </State> <ZipCode> 13761 </ZipCode>
  </Address>
  <Address>
     <Party> Selling Party </Party> <Name> Corporate Graphics </Name>
     <Street> One Stationery Pl. </Street> <City> Rexburg </City>
23   <State> ID </State> <ZipCode> 83441 </ZipCode>
  </Address>
  <TotalAmount> 205.29 </TotalAmount>
</PurchaseOrder>
```

FIG. 1

```
                                                                  30
<!DOCTYPE    PO [
<!ELEMENT  0 PurchaseOrder (PONumber Purpose Date Type LineItem* Address*
                   TotalAmount)>
<!ELEMENT  1 PONumber ( #PCDATA ) >
<!ELEMENT  2 Purpose ( #PCDATA ) >
<!ELEMENT  3 Date ( #PCDATA ) >
<!ELEMENT  4 Type ( #PCDATA ) >
<!ELEMENT  5 LineItem ( ItemNO Quantity Unit UnitPrice ProductService*
                 ProductDescription* Address*) >
<!ELEMENT  6 Address ( Party Name AdditionalName? Street Street2?
               City State ZipCode ) >
<!ELEMENT  7 TotalAmount ( #PCDATA ) >
<!ELEMENT  8 ItemNO ( #PCDATA ) >                       32
<!ELEMENT  9 Quantity ( #PCDATA ) >
<!ELEMENT 10 Unit ( #PCDATA ) >
<!ELEMENT 11 UnitPrice ( #PCDATA ) >
<!ELEMENT 12 ProductService ( ServiceID ServiceDescription ) >
<!ELEMENT 13 ProductDescription ( Format Description ) >
<!ELEMENT 14 Party ( #PCDATA ) >
<!ELEMENT 15 Name ( #PCDATA ) >
<!ELEMENT 16 AdditionalName ( #PCDATA ) >
<!ELEMENT 17 Street ( #PCDATA ) >
<!ELEMENT 18 Street2 ( #PCDATA ) >
<!ELEMENT 19 City ( #PCDATA ) >
<!ELEMENT 20 State ( #PCDATA ) >                 34
<!ELEMENT 21 ZipCode ( #PCDATA ) >
<!ELEMENT 22 ServiceID ( #PCDATA ) >
<!ELEMENT 23 ServiceDescription ( #PCDATA ) >
<!ELEMENT 24 Format ( #PCDATA ) >
<!ELEMENT 25 Description ( #PCDATA ) >
] >
```

FIG. 2

Sample Purchase Order

| | |
|---|---|
| P.O. Number: 1200 | Date: 980116 |
| Purpose: Original | Type: Stand-alone Order |

Item Summary

| PO Line Item # | Qty Ordered | Unit | Unit Price |
|---|---|---|---|
| *0001* | 1 | Box | $5.29 |
| *0002* | 10 | Case | $20.00 |

| Bill-to-Party | |
|---|---|
| Name | IBM Corporation |
| Additional Name | Account Payable |
| Address | PO Box 9005 |
| Additional Address | |
| City | Endicott |
| State | New York ▼ |
| Postal Code | 13761 |

| Selling Party | |
|---|---|
| Name | Corporate Graphics |
| Additional Name | |
| Address | One Stationery Pl. |
| Additional Address | |
| City | Rexburg |
| State | Idaho ▼ |
| Postal Code | 83441 |

Total Monetary Amount: $ *205.29*

FIG. 4

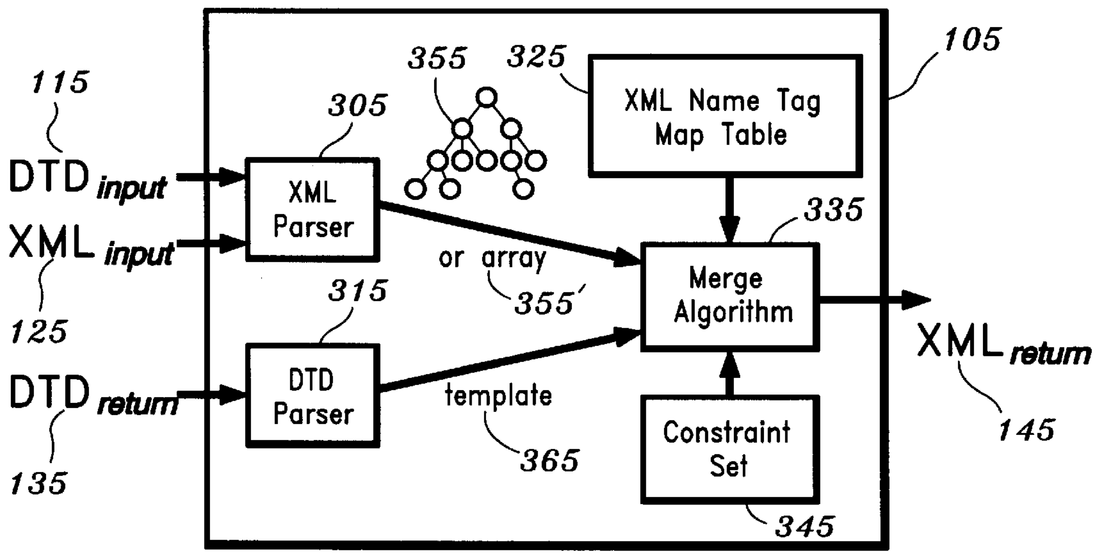

FIG. 7

| 405 | 325 / 415 |
|---|---|
| PO.SENDER.LOOP_ADDRESS.STREET | INVOICE.RECEIVER.LOOP_ADDRESS.STREET |
| PO.SENDER.LOOP_ADDRESS.STATE | INVOICE.RECEIVER.LOOP_ADDRESS.STATE |
| PO.SENDER.LOOP_ADDRESS.ZIPCODE | INVOICE.RECEIVER.LOOP_ADDRESS.ZIPCODE |
| PO.ITEM.QUANTITY | INVOICE.ITEM.QUANTITY |
| PO.ITEM.UNIT | INVOICE.ITEM.UNIT |
| PO.ITEM.PRICE | INVOICE.ITEM.PRICE |
| PO.ITEM.DESCRIPTION | INVOICE.ITEM.DESCRIPTION |
| PO.RECEIVER.LOOP_ADDRESS.STREET | INVOICE.SENDER.LOOP_ADDRESS.STREET |
| PO.RECEIVER.LOOP_ADDRESS.STATE | INVOICE.SENDER.LOOP_ADDRESS.STATE |
| PO.RECEIVER.LOOP_ADDRESS.ZIPCODE | INVOICE.SENDER.LOOP_ADDRESS.ZIPCODE |

FIG. 8

| 505 | 345 / 515 |
|---|---|
| INVOICE.SENDER.LOOP_ADDRESS | 4 |
| INVOICE.RECEIVER.LOOP_ADDRESS | 4 |
| INVOICE.ITEM.LOOP_DETAIL_DESCRIPTION | 8 |
| INVOICE.ITEM.LOOP_SPECIAL_CHARGE | 10 |
FIG. 9
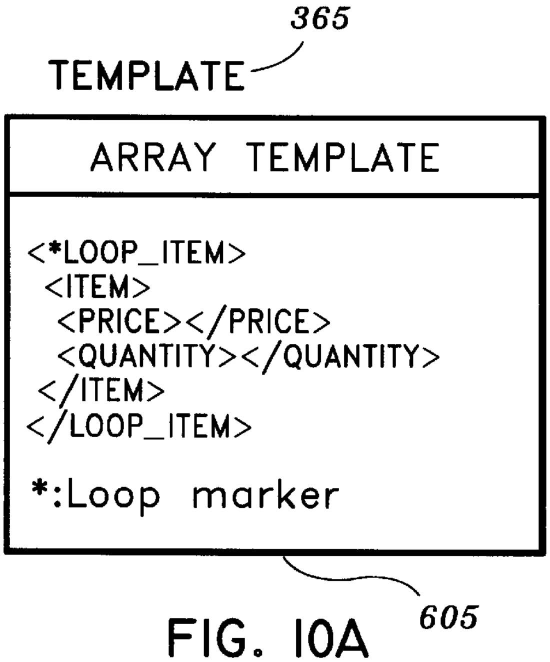
FIG. 10A
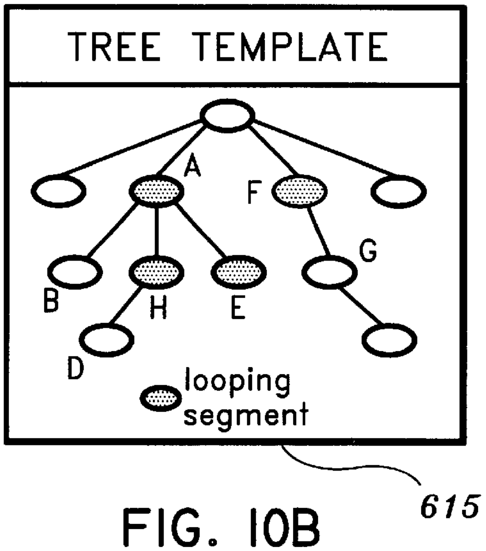
FIG. 10B int VISIT_NODE(C)

return 0, if current tag ("<C>") is not printed;
1, if current tag is printed

/* C: current node; ATAG: suspending tags concatenation */

Process all children nodes suspending ancestor tags

DYNAMIC BUSINESS PROCESS AUTOMATION SYSTEM USING XML DOCUMENTS

BACKGROUND OF THE INVENTION

1. Field of the Invention

The present invention relates to automated document information exchanges and, more particularly, to a system and method for automating document exchange and merging.

2. Description of the Related Art

Businesses and trading partners exchange business documents for records of transactions. Traditionally, these exchanges were performed by mail or courier thereby requiring paperwork and introducing delays. With advancements in network technologies and the development of improvements in the Internet more business is transacted "on-line".

There are many instances where documents of one type are issued in response to documents of another type. For example, suppliers can issue invoice documents based on received purchase order (PO) documents, or issue a reply to request for quote documents based on received request for quote documents, from prospective buyers. Developing solutions for any such document pair may be tedious, and hard to maintain, especially if the solution include manual document production and record keeping.

Therefore, a need exists for a business process automation system for dynamically exchanging and merging documents.

SUMMARY OF THE INVENTION

A system for exchanging and merging messages over a network includes a server accessible by a plurality of remote browsers for transmitting a template including fields for information entry and a business system accessible by the server for generating a return message pursuant to information entered in the template on the browsers. The business system includes a first parser for receiving a message from a browser, the message including information about data characteristics of information entered into the template, and a second parser for receiving information about data characteristics to provide a return template. A merging algorithm is implemented to merge the message with the return template for providing a return message to the browser having portions of the return template with data entered therein.

In alternate embodiments, the information entered into the template is preferably associated with tag names and the means for merging may include a name tag map for correlating tags names of the template with tag names of the return template. The message may include information having a name and a value and the first parser parses the first message into name and value pairs. The first message may be written in an extensible markup language (XML) and the data type information may be in a corresponding data type definition format (DTD). The means for merging may include a constraint set for identifying tag names used in multiple instances. The constraint set may provide higher level tag names to identify the tag names used in multiple instances. The network is preferably the Internet. The first parser parses the first message to preferably provide tag name and value information in a format of one of a document object model tree and an array.

A system for exchanging and merging extensible markup language (XML) documents over the Internet includes a server accessible by a plurality of remote browsers for transmitting a template including fields for information entry, and a business system accessible by the server for generating a return XML document pursuant to information entered in the template on the browsers. The business system includes a first parser for receiving a first XML document and a corresponding data type definition(DTD)file from a browser, a second parser for receiving a return data type definition(DTD)file to provide a return template and means for merging the first XML document with the return template for providing the return XML document to the browser having portions of the return template with data entered therein corresponding to at least some of the information entered into the template.

In alternate embodiments, the information entered into the template is preferably associated with tag names and the means for merging includes a name tag map for correlating tag names of the template with tag names of the return template. The first XML document may include information having a name and a value and the first parser parses the first XML document into name and value pairs. The means for merging may include a constraint set for identifying tag names used in multiple instances. The constraint set may provide higher level tag names to identify the tag names used in multiple instances. The first parser preferably parses the first XML document to provide tag name and value information in a format of one of a document object model tree and an array.

A program storage device readable by machine, tangibly embodying a program of instructions executable by the machine to perform method steps for merging and exchanging documents over a network, the method steps includes providing an input document including name tags and data information in a predetermined form, compiling the input document to arrange the names and data into an input document format, providing a return document format including name tags, comparing the name tags of the input document and the name tags in the return document format to match equivalent name tags and merging the input document format with the return document format to provide a return document with portions filled in with at least some information included in the input document.

In alternate embodiments of the program storage device, the step of providing an input document may include the step of providing an input document on a template having data field therein for data entered, the data fields being labeled with name tags to identify the data. The step of compiling may include the step of parsing the input document into name tag and value pairs in one of a node tree format and an array format. The step of comparing the name tags may include the step of providing a name tag map to correlate equivalent name tags. The step of providing a return document format may include the step of providing looping information to identify name tags according to a constraint set such that name tags employed in multiple instances are identified. The constraint set may provide higher level tag names to identify the tag names used in multiple instances.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 1 depicts a sample XML document encoding a purchase order for use with the present invention;

FIG. 2 is a data type definition (DTD) for the sample purchase order shown in FIG. 1 for use with the present invention;

FIG. 4 is a sample purchase order layout according to the information of FIGS. 1 and 2;

FIG. 7 is a flow diagram shown in greater detail of the dynamic XML document exchange system depicted in FIG. 5 in accordance with the present invention;

FIG. 8 is an example of a XML name tag map table, as depicted in FIG. 7 in accordance with the present invention;

FIG. 9 is an example of a constraint set table, as depicted in FIG. 7 in accordance with the present invention;

FIG. 10A is an illustrative array template structure as depicted in FIG. 7 in accordance with the present invention;

FIG. 10B is an illustrative tree template structure as depicted in FIG. 7 in accordance with the present invention.

DETAILED DESCRIPTION OF PREFERRED EMBODIMENTS

Figure 3:
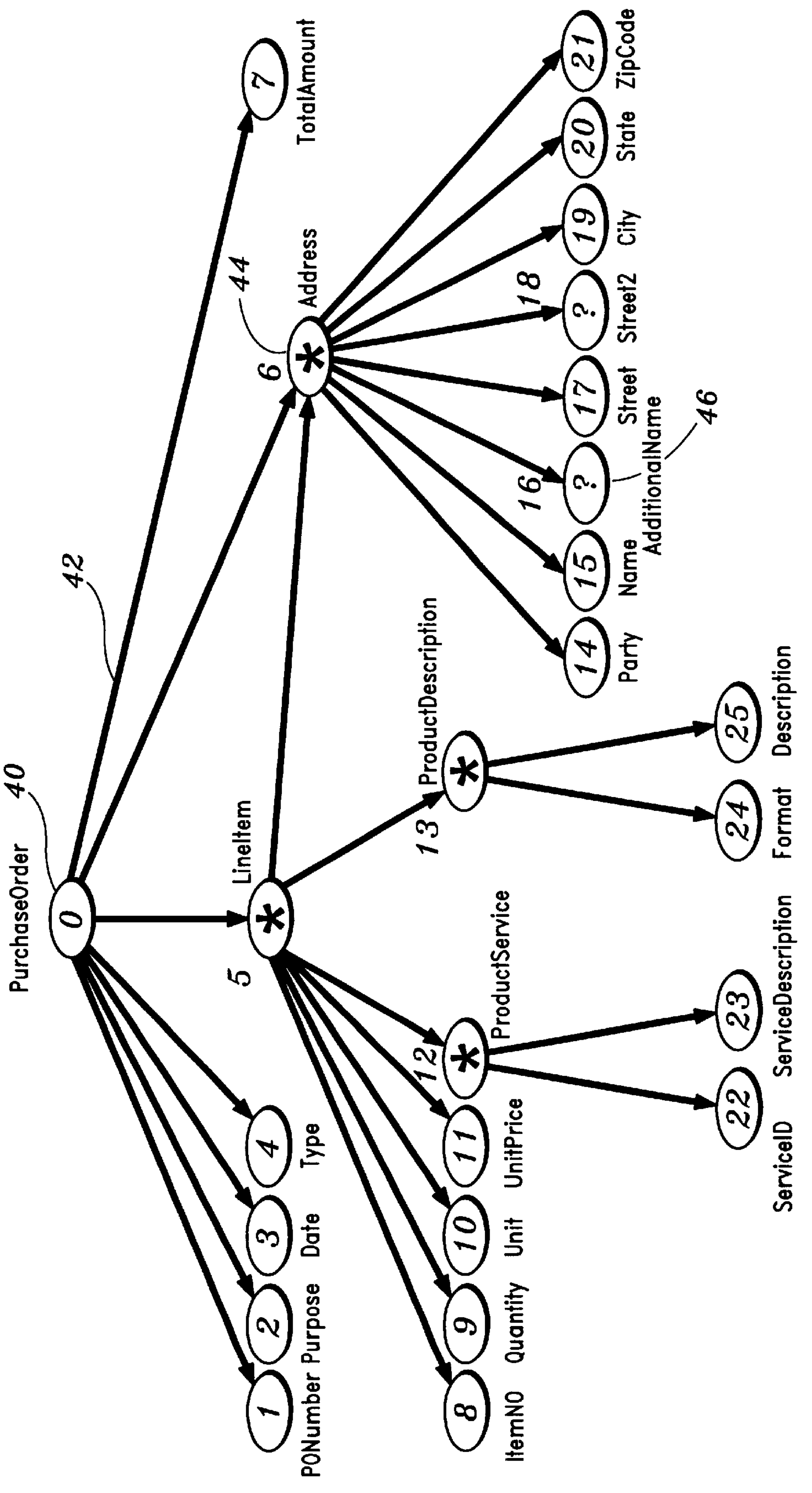
FIG. 3 is a graphical structure of the DTD of FIG. 2 for use with the present invention.
Figure 5:
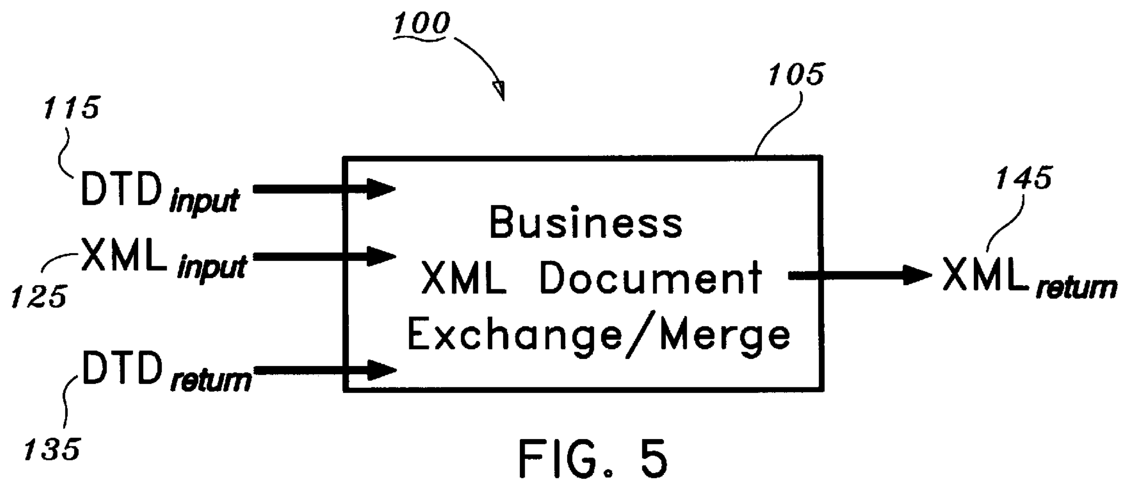
FIG. 5 is a flow/block diagram of a dynamic XML document exchange system, for business process automation in accordance with the present invention.

The present invention relates to automated document information exchanges and, more particularly, to a system and method for automating document exchange and merging. The document exchange and merge preferably includes the use of extensible Markup Language (XML) documents. An XML name tag map table design, Document Object Model (DOM) tree parsing or serialization, return document template generation, constraint set design, and a document merging algorithm are included in an automated document merging and exchange system, in accordance with the present invention. Although described in terms of XML, DTD and DOM languages/codes, other languages/codes may be implemented in accordance with the invention.

Business documents may be presented by extensible Markup Language (XML) for Internet transmission and World Wide Web access. A business process automation system may receive an XML message or document and its corresponding Data Type Definition (DTD), and generate a return XML message based on a return document DTD, with certain fields pre-filled from the first XML message.

The XML name tag map table matches a relevant name tag of document fields of a first document to the corresponding name tag of a second document's (or return document's) fields. The name tag map table may be created by standard editors or tools. Higher level qualifiers or name tags may be needed to uniquely identify the specific name tag for potential ambiguity due to repetitive usage of the same name throughout the transaction set.

DOM tree parsing or serialization prepares the first document in a suitable data structure, such as tree or array, for efficient processing and matching. The XML parser can be embedded in a web browser such as the Microsoft® XML parser, or run as a server side application such as IBM Tokyo Research Laboratory XML Parser for Java. The XML parser may receive the first XML document and its DTD, and generate a DOM tree or a serialized name/value pair array. Due to looping, the same tag names may occur multiple times in the DOM tree or the array. Looping includes reusing a format for data entry, for example, a purchase order may include more than one item to be ordered. The same code is used to generate fields for data entry on a template, looping generates the fields needed.

Using parsing techniques, a DTD parser may be created for generating a return document template or a return document DTD parse tree, which can assist the document merge algorithm to prepare the return XML document. The DTD parser transforms the DTD with repeatable and optional fields into a template in tree structure or serialized array with special markers around loop header nodes or name tags. Optional fields may include a second business address or phone number, for example.

In one case, the automation system, in accordance with the invention, allows a fixed amount of iterations for certain loop tags, e.g., always displaying special service and charge fields, or in another case allowing a variable number of iterations, e.g., the number of items sold in the transaction is unknown and is dependent on the number of items recorded on the first document. The first case is resolved preferably by using a constraint set, which defines the name of the loop tag, and an integer indicating a number of fixed occurrences. Higher level qualifiers or name tags may be used to distinguish the same tag names that are used multiple times. The latter case can be resolved by reserving only one iteration for such type of loops in the template, and expanding the loops (with new name tags and values) during the run-time by matching the actual number of iterations in the first document. The special markers in the template are introduced to confine the loop to expand one iteration. Similar to the XML name tag map table, the constraint set may be constructed by standard editors or tools.

A document merging algorithm, in accordance with the invention, generates a return XML document, by either sequentially scanning the name tags from the template in an array structure, or recursively traversing the DTD tree node from the template in a tree structure, to match their counterparts in the XML DOM tree or the serialized array using the XML name tag map table. If a match is found, the corresponding value of the first XML message is retrieved and treated as the value associated with the current name tag. When a name tag with the special marker is detected, a loop is found or revisited, in which case the loop header tag is checked with the constraint set for loop count, or the tags inside the loop are matched against the XML DOM tree or serialized array, to determine if the content of the loop should be generated again. The algorithm handles both variable number and fixed number of loop iterations. Referring now to the drawings in which like numerals represent the same or similar elements and initially to FIG. 1, a sample XML document is depicted for encoding a Purchase Order (PO), where there are two items ordered, i.e., item Nos. 0001 and 0002. Each item includes information code which begins at line items (LineItem) 20 and (LineItem) 25, respectively. Line item 20 includes detailed product descriptions, service types, and ship to address, and the line item 25 includes only key information, such as price, quantity and unit. Other information is included, for example, address information 21 and a total amount of the purchase 23.

Referring to FIG. 2, a Data Type Definition (DTD) for the sample PO of FIG. 1 is shown. DTD defines 26 data elements (0–25). The Address data element 6 is referred by the data elements Purchase Order 0 and LineItem 5, where LineItem itself is referred by PurchaseOrder 0 as indicated by the numeral 30. Repeatable data elements are marked with a "*", e.g., the LineItem indicated by 30 referred by PurchaseOrder 0, and optional data elements which can occur zero or once are marked with a "?", e.g., AdditionalName indicated at numeral 32 referred by Address 6. The "#PCDATA" 34 represents parsed character data. The style sheet written in, for example, Javascript, XSL, or CSS provides a way to render the XML document (FIG. 1) to a browser (see FIG. 4).

Referring now to FIG. 3, the DTD of FIG. 2 is depicted in a graphical tree structure. Oval-shaped nodes 40 represent data elements. Each data element corresponds to the data elements of the same number (or symbol) as indicated in FIG. 2. Arrows 42 from data elements (for example, data element X, not shown) to another data element (for example data element Y, not shown) are drawn, if X referred Y during X's definition. A special marker, "*", within a node represents a repeatable data element, for example element 44, and a "?" within a node represents an optional data element 46, i.e., a data element which may not be needed for processing the PO, such as a second street address. The Address data element 6 has been referred twice, once by PurchaseOrder 0 and once by LineItem 5, respectively. The DTD graph of FIG. 3 is employed to simplify data processing in accordance with the invention. In this way, data elements may be mapped and visited more efficiently.

Referring to FIG. 4, data elements and tag/label names from FIG. 1 are associated and placed in data/information entry fields in an illustrative document layout.

It should be understood that the elements shown in FIGS. 5–11 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 5, a flow/block diagram for the business process automation system 100 is shown according to the present invention. An exchange/merge system 105 receives an XML message 125 and its DTD 115, and generates a return XML message 145 based on the return message DTD 135. Other languages/codes may be used in addition to or instead of XML and/or DTD.

Figure 6:
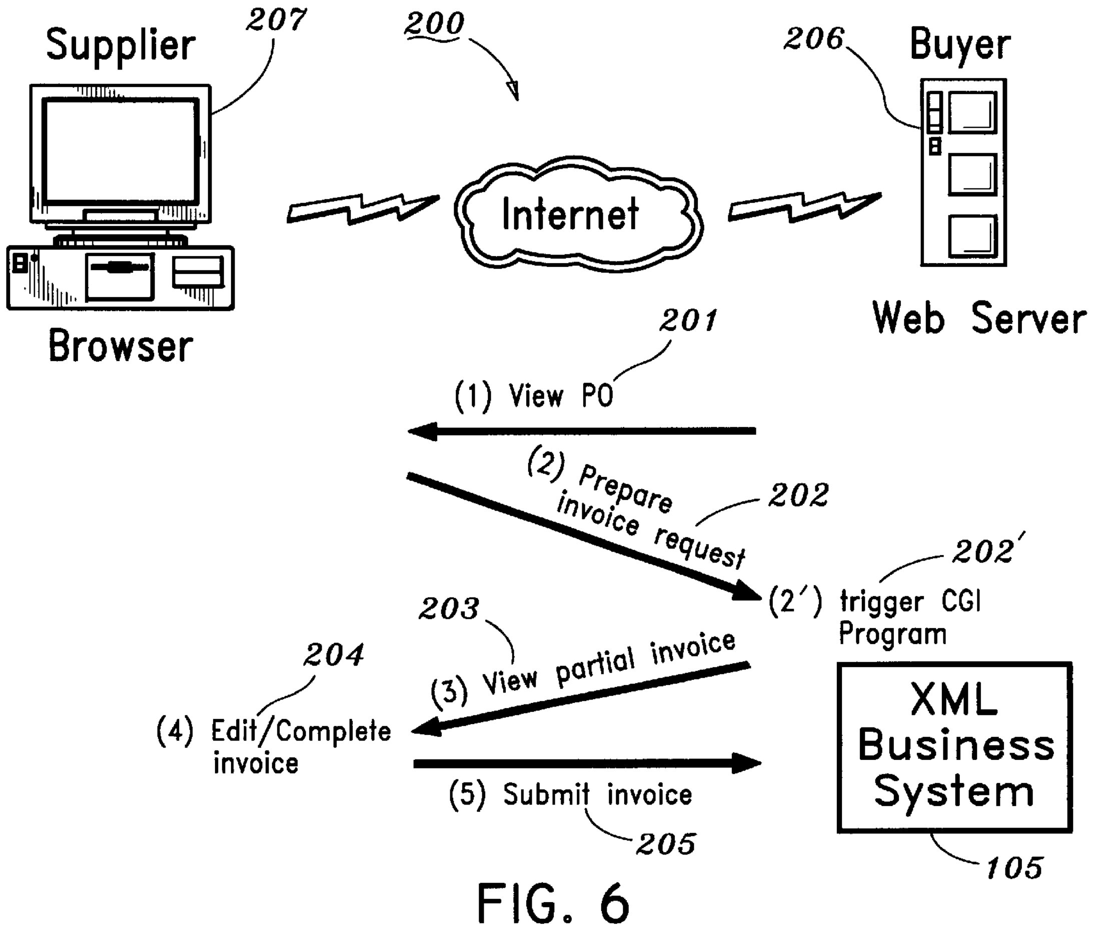
FIG. 6 is a schematic diagram showing a document exchange for an Internet purchase order/invoice document exchange in accordance with the present invention.

Referring to FIG. 6, an automatic Internet purchase order (PO) and invoice document exchange system/method 200 is shown. Although described by way of example for the Internet, system 200 may include other network systems, for example a local area network (LAN), a wide area network (WAN), etc.

In the illustrative example shown in FIG. 6, a buyer runs a web server 206. In step 201, a supplier can visit the buyer's web site to view PO's using a standard web browser 207. The supplier may decide to create a corresponding invoice from the received PO by submitting a "prepare invoice" request 202 to the web server. The XML document exchange/merge system 105 on the buyer side is invoked and dynamically generates a partial invoice 202'. The partial invoice in XML format is transmitted over the Internet and displayed on supplier's browser 203. The supplier can edit the partial invoice 204, and submit the completed invoice back to the buyer for record handling or auditing 205. The system 105 can also be run on the supplier side browser as programs written in Javascript, or as Java applets, for example.

Referring to FIG. 7, an internal flow diagram of a dynamic XML document exchange system 105 is shown. A standard XML parser 305 takes the input XML 125 and DTD 115, and generates an intermediate structure, a tree 355 or an array 355', which serves as part of the input data to a merge algorithm 335. The XML parser 305 may be a client side application, which may serialize tree elements into an array of hyper-text markup language (HTML) components 355', or a server side stand-alone application, which may construct the tree structure 355 (See FIGS. 10A and 10B). After parsing the return document DTD 135, the DTD parser 315 creates a template 365 in either array format 605 or tree structure 615, as shown in FIGS. 10A and 10B, respectively.

Referring to FIG. 8, an example XML name tag map table 325 (FIG. 7) is illustratively shown in greater detail. XML name tag map table 325 includes rows which have a pair of mapped name tags, one for a first XML type 405, and the other for a return XML type 415. To avoid ambiguity due to the possible usage of the same tags in different locations of the DTD, higher level qualifiers or ancestors' name tags may be included in the entries as shown in FIG. 8. In the example, the table 325 advantageously maps the sender of the PO to the receiver of the invoice, while mapping the receiver of the PO to the sender of the invoice.

Referring to FIG. 9, an example of a constraint set table 345 (FIG. 7)is illustrated in greater detail. Constraint set table 345 includes rows which have two entries, one for name tags 505, and the other for a number of iterations 515 (corresponding to the loop headed by the name tags) that should be generated, for every encounter of the loop header tag in the merge algorithm 335 (FIG. 7). In the example, the merge algorithm 335 generates four sender address segments and ten special charge segments, whether or not there is any contents in the created segments. For the same reason as the XML name tag map table 325, higher level qualifiers or ancestors' name tags are included with the name tags 505 in the first column.

Referring to FIGS. 10A and 10B, two template structures are depicted, one in character array format 605 (FIG. 10A), and the other in tree structure 615 (FIG. 10B) . In the array format, a marker "*" associated with a tag is employed to identify a loop header tag, e.g. LOOP_ITEM, while in the tree structure, shaded ovals represent a loop header node, e.g., nodes A, H, E, and F.

Referring to FIGS. 11A–11E, the merge algorithm 335 (FIG. 7) is illustrated in greater detail. The merge algorithm may operate on the tree template 615. With modifications, the merge algorithm 335 may be adapted to the array template 605 as well. The algorithm VISIT_NODE(C), where C is a current node, recursively traverses a DTD graph output from DTD parser 315, matching name tags from the first document using the XML name tag map table 325, and passing along a variable token ATAG recording suspended tags (suspended tags are tags which are not yet printed due to their dependence on an optional node) for previously visited but not yet printed nodes (a printed node is a node which is printed or output as part of $XML_{return}$ 145 (FIG. 7). Throughout FIGS. 11A–11E, outputs include a "0" if the current tag is not printed and a "1" if the current tag is printed.

VISIT_NODE( ) is preferable employed as a subroutine or software module to recursively visit each node and determine tag names both ancestors (i.e., parents) and descendants (i.e., children) to process each node for matching the first document to the second document as described above. Other matching/merging techniques may also be implemented.

Whenever a node is visited, a null ATAG represents that there is no suspending tag string, and its parent node has printed the tag. Due to the existence of optional tags, certain tags are suspended printing until at least one of the descendants is printed. For example, consider the tree template 615 depicted in FIG. 10B, the sub-tree rooted at A is traversed in the order of A, B, H, D, and E. Since node A is optional, its tag "<A>" cannot be printed until any of its descendants is printed. Therefore, ATAG carries "<A>" when the algorithm visits node B. In block 702, C is checked to determine if it is a leaf node. A leaf node is a node without a child node, for example node B is a leaf node of A in FIG. 10B. Since node B is a leaf node, the algorithm matches its tag with the XML name tag map table to locate its corresponding tag, say $B_1$(not shown), in the first document in block 705.

The value of C (denoted as MC) is retrieved. In block 707, if ATAG is not null, i.e. a tag string is being suspended and MC has a non-zero (non-null) value, the suspended string and the node tag are printed, and the value MC is printed, in block 710. Also, ATAG is initialized to null again. If the next available value (MC) of $B_1$ exists in block 710, the algorithm will print ATAG ‖ "<B>" ‖ MC ‖ "</B>", i.e., "<A><B>map value </B>", where "‖" denotes string concatenation. A close stage "</B>" completes the scope of its start tag "<B>" . Otherwise the algorithm checks if C is optional in block 715. If C is optional, for example, when an additional address is tendered, see, e.g., additional address 46 of FIG. 3, ATAG may still include a suspended string. If C is not optional, ATAG will become ATAG ‖ "<C></C>" in block 720, which guarantees the printing of C's tag whenever it parent's tag is printed.

Figure 11A:
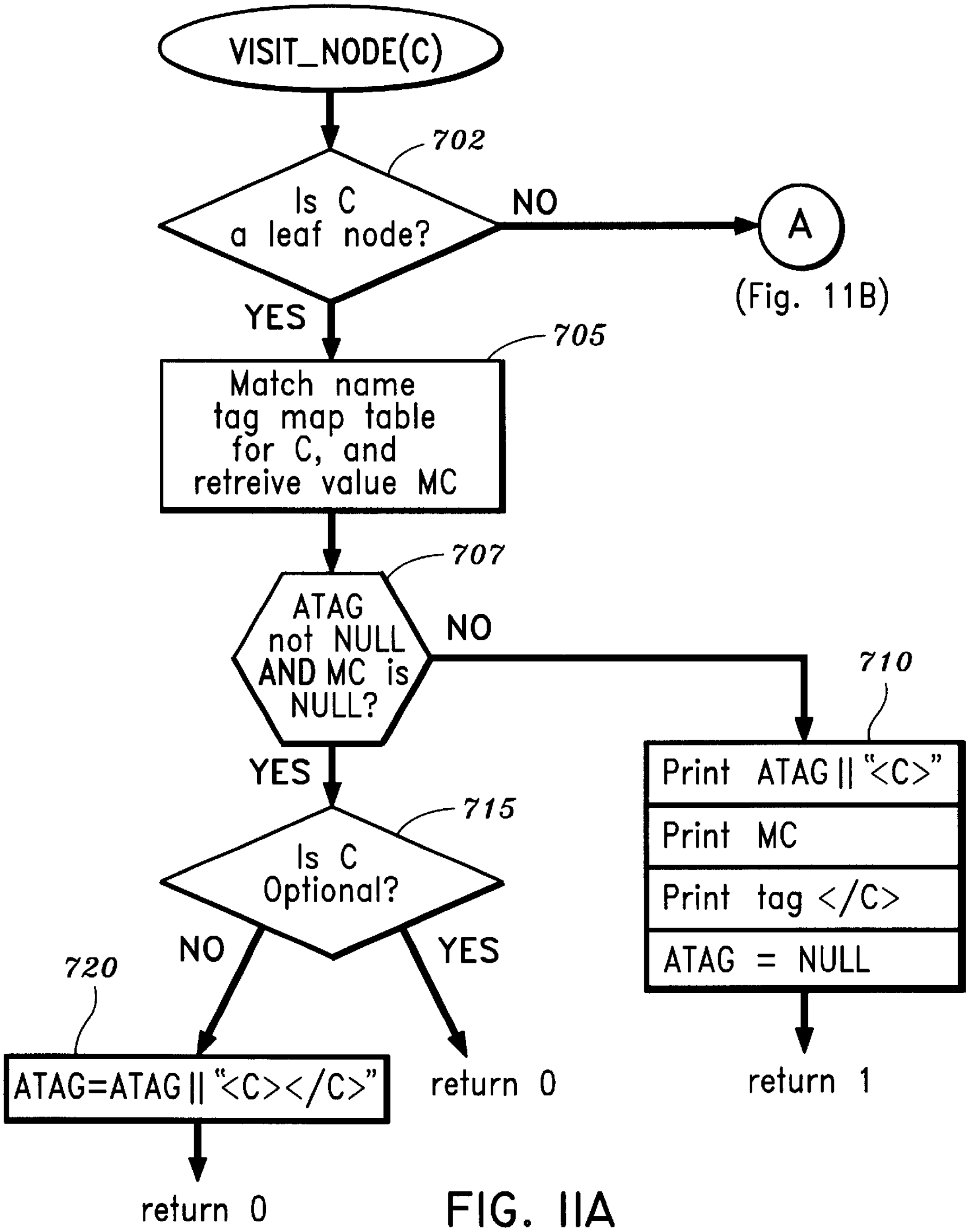
FIGS. 11A–11E are a flow diagram showing a merge algorithm which operates on the tree template as depicted in FIG. 10B.
Figure 11B:
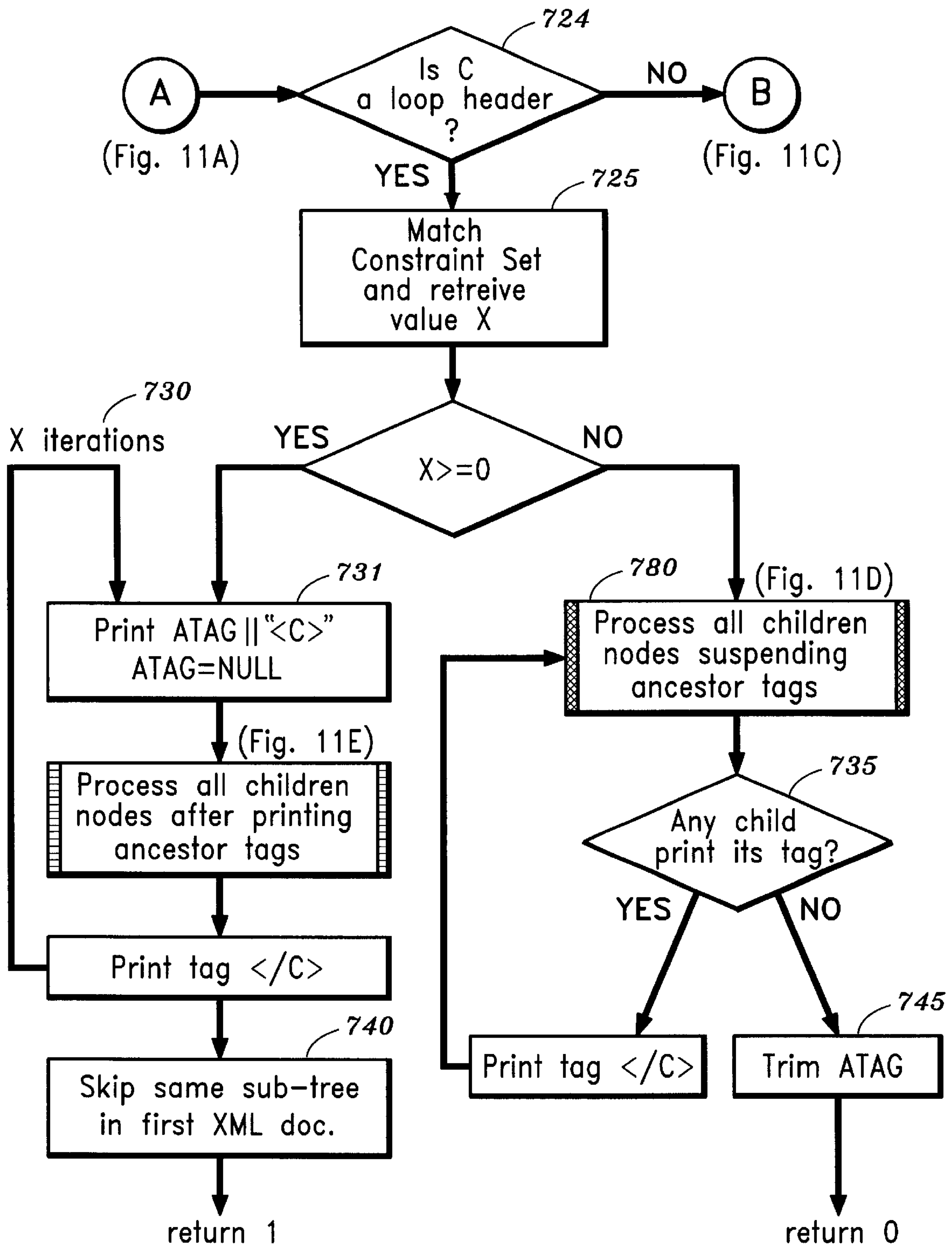

If C is determined to not be a leaf node in block 702 the flow path is directed to FIG. 11B. If C is a loop header which designates a number of iterations to be performed as determined in block 724, a constraint set is matched and the values of the constraint set are retrieved for the loop header C in block 725. The loop header C retrieves a value for X which represents a number of iterations, for example. If X is greater than or equal to 0, the flow path is directed to block 731 where the suspending tags (ATAG) are printed for tag. <C>, for all ancestor nodes. Now all descendants (child or children nodes) of C are processed according to the flow diagram shown in FIG. 11E which recursively calls the VISIT_NODE( ) algorithm for each descendant, and reinitializes ATAG to Null when the last descendant is reached. The constraint set provided in block 725 may force the C loop to be printed a certain amount (X) of times shown as loop 730.

The first XML document may include more than the X iterations or map items 730 needed to fill in the return document template, these items may be skipped and not appear in the return document in block 740.

If X is less than 0, all children nodes are processed which suspend ancestor tags according to the flow diagram shown in FIG. 1D. ATAG is concatenated with the tag of the present node C in block 760. If there are children nodes in block 761, the flow path calls VISIT_NODE( ) in block 762 for the child nodes and continues until the current tag is printed from block 763. Then, ATAG is set to null again in block 764.

After traversing all of the descendants of C, if no child's tag is printed from block 735, the algorithm trims the ATAG which removes every tag from the end of ATAG up to the leftmost tag in block 745 "<H>" in this example, which was attached to ATAG when H was visited in block 760. The ATAG will be the same as before H was visited. For example, ATAG may include "<A><B>" when H was visited. After the algorithm visits node D and returns to node C, ATAG may become "<A><B><H><D>" due to no match for D. Since the search has exhausted all of H's children in block 735, and no child's tag has been printed, the algorithm can recover ATAG by trimming it in block 745. The new ATAG should include "<A><B>."

Figure 11C:
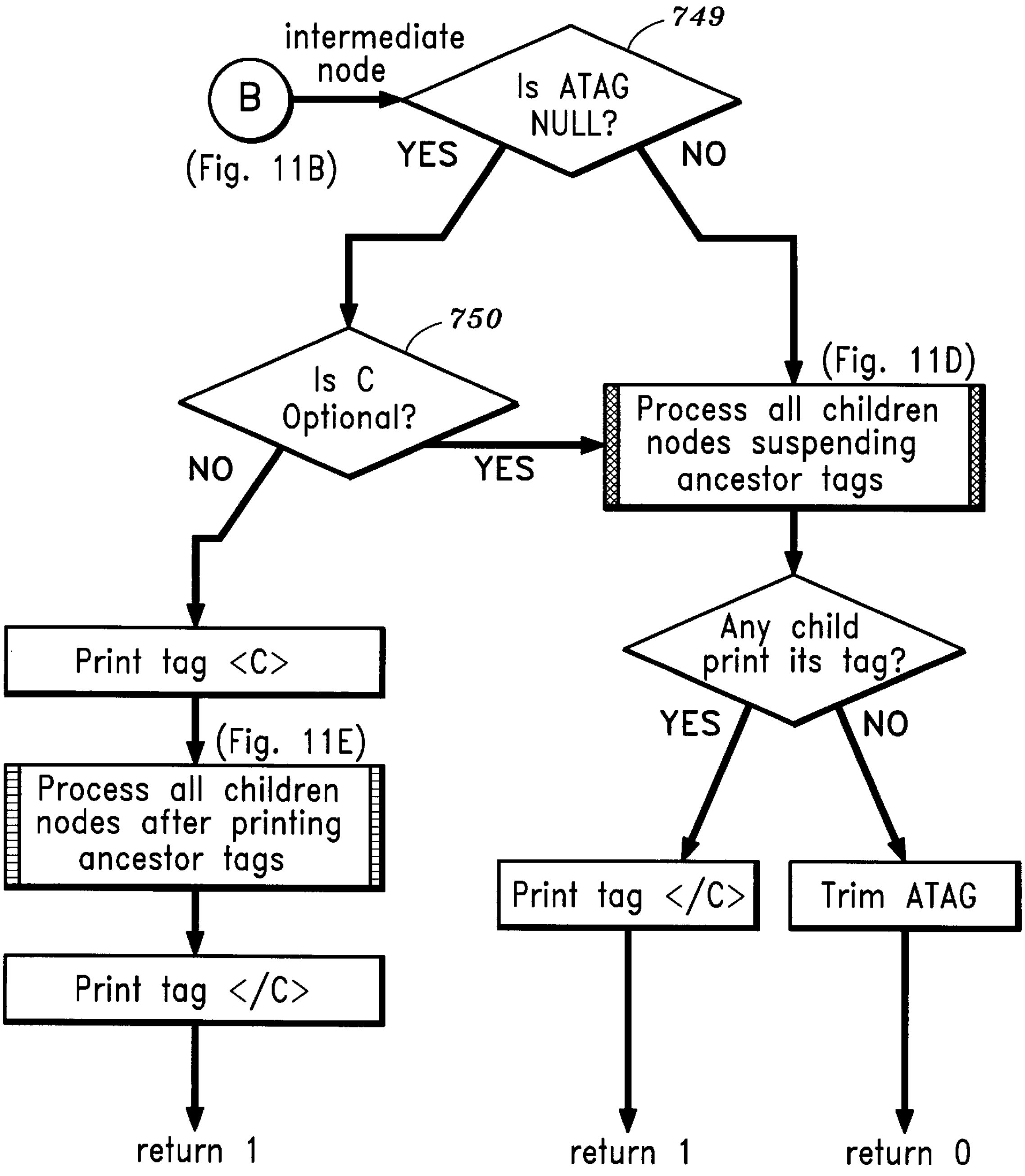
Figure 11D:
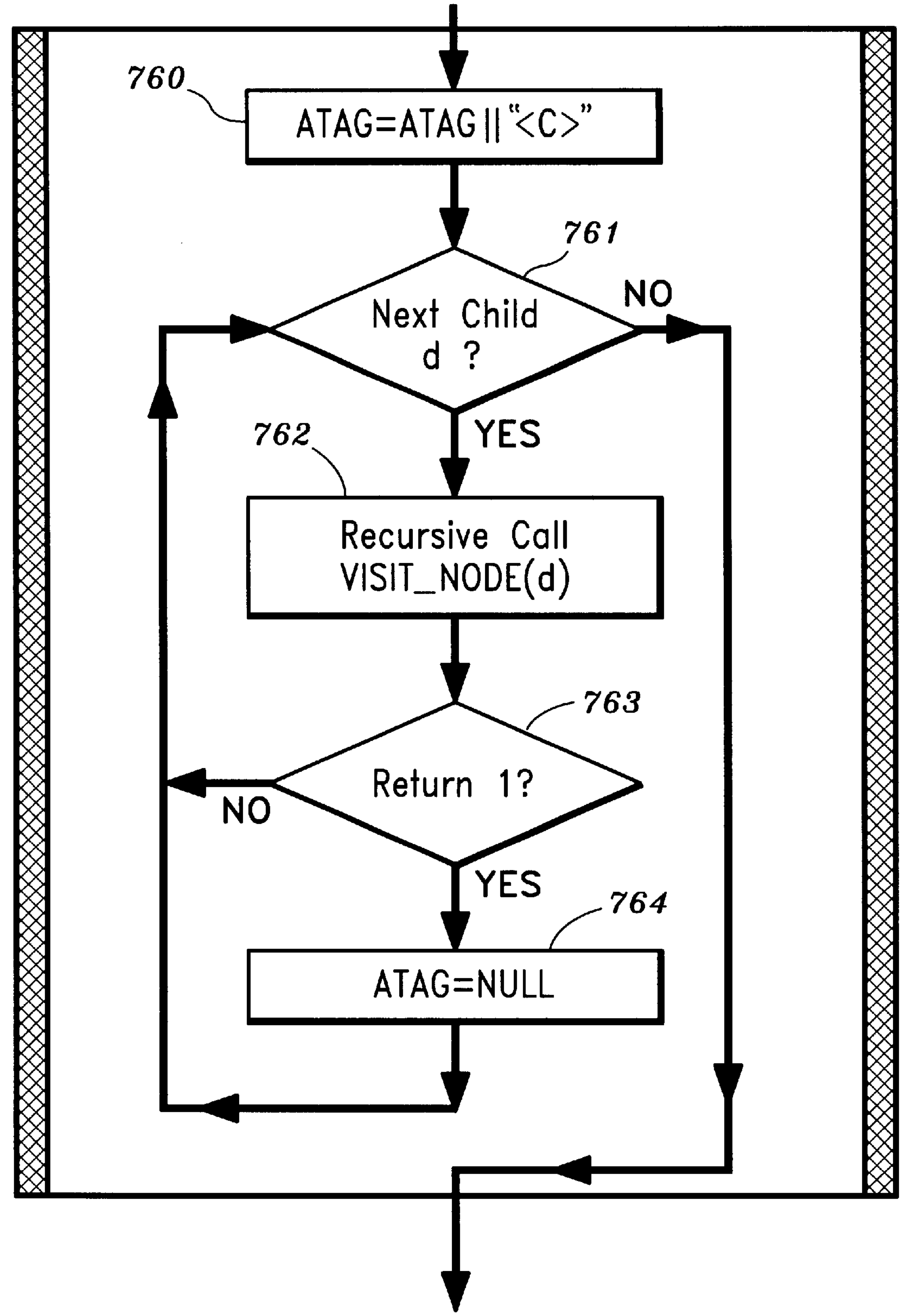
Figure 11E:
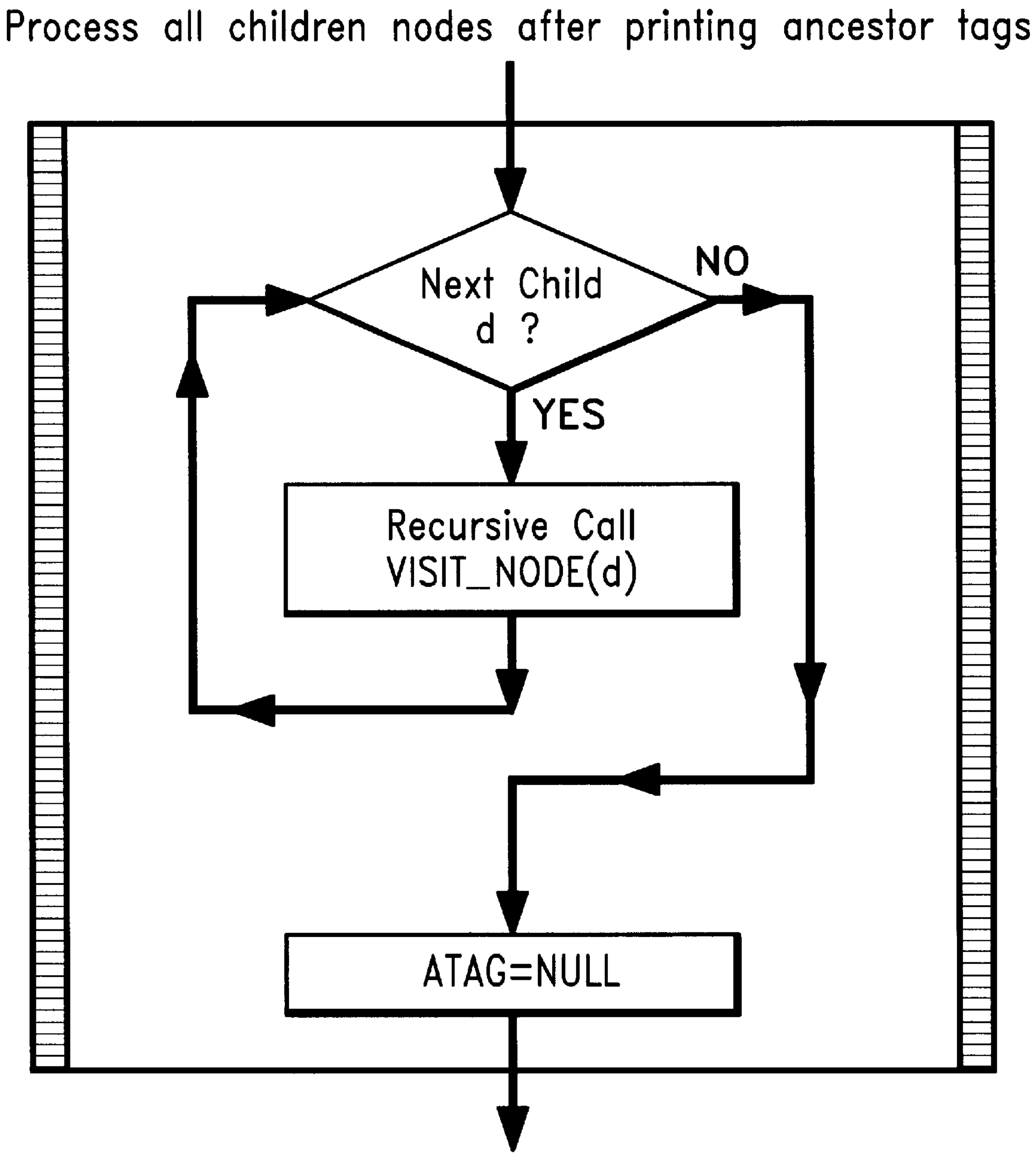

For intermediate nodes such as node G in FIG. 10B, if ATAG is not NUll, i.e., its parent's tag has not been printed, the algorithm in FIG. 11C goes through the same procedure as indicated by 780 in FIG. 11B from block 749, except executing it only once. Otherwise the algorithm checks if G is optional in block 750 to decide whether to print "<G>" right away, or to pass ATAG ‖ "<G>" along its descendants again using the flow path as indicated in FIG. 11E.

The result of the merge algorithm as described in FIGS. 11A–E is an XML return document generated automatically, by either sequentially scanning the name tags from the template in an array structure, or recursively traversing the DTD tree node from the template in a tree structure, to match their counterparts in the XML DOM tree or the serialized array using the XML name tag map table. If a match is found, the corresponding value of the first XML message is retrieved and treated as the value associated with the current name tag. When a name tag with the special marker is detected, a loop or repeatable item is found or revisited, in which case the loop or repeatable item header tag is checked with the constraint set for loop or iteration count, or the tags inside the loop are matched against the XML DOM tree or serialized array, to determine if the content of the loop should be generated again. The algorithm handles both variable number and fixed number of loop iterations.

Having described preferred embodiments of a dynamic business process automation system using XML documents (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for exchanging and merging messages over a network comprising:

a server accessible by a plurality of remote browsers for transmitting a template including fields for information entry; and a business system accessible by the server for generating a return message pursuant to information entered in the template on the browsers, the business system including:

a first parser for receiving a first message from a browser, the first message including information about data characteristics of information entered into the template and name tags;

a second parser for receiving information about data characteristics to provide a return template, the return template including name tags; and means for merging the first message with the return template for providing the return message to the browser, the return message having portions of the return template with data entered therein corresponding to at least some of the information entered into the first message, wherein the means for merging includes a name tag map for correlating the tag names of the first message with the tag names of the return template.

2. The system as recited in claim 1 wherein the message includes information having a name and a value and the first parser parses the first message into name and value pairs.

3. The system as recited in claim 1 wherein the first message is written in an extensible markup language (XML) and the data type information is included in a corresponding data type definition format (DTD).

4. The system as recited in claim 1 wherein the means for merging further includes a constraint set for identifying name tags used in multiple instances.

5. The system as recited in claim 4 wherein the constraint set includes higher level name tags to identify the name tags used in the multiple instances.

6. The system as recited in claim 1 wherein the network is an Internet.

7. The system as recited in claim 1 wherein the first parser parses the first message to provide tag name and value information in a format of one of a document object model tree and an array.

8. A system for exchanging and merging extensible makeup language (XML) documents over an Internet comprising:

a server accessible by a plurality of remote browsers for transmitting a template including fields for information entry; and a business system accessible by the server for generating a return XML document pursuant to information entered in the template on the browsers, the business system including:

a first parser for receiving a-first XML document and a corresponding data type definition (DTD) file from a browser, the first XML document including name tags;

a second parser for receiving a return data type definition (DTD) file to provide a return template, the return template including name tags; and means for merging the first XML document with the return template for providing the return XML document to the browser, the return XML document having portions of the return template with data entered therein corresponding to at least some of the information entered into the first XML document, wherein the means for merging includes a name tag map for correlating the name tags of the first XML document with the name tags of the return template.

9. The system as recited in claim 8 wherein the first XML document includes information having a name and a value and the first parser parses the first XML document into name and value pairs.

10. The system as recited in claim 8 wherein the means for merging further includes a constraint set for identifying name tags used in multiple instances.

11. The system as recited in claim 10 wherein the constraint set includes higher level name tags to identify the name tags used in the multiple instances.

12. The system as recited in claim 8 wherein the first parser parses the first XML document to provide tag name and value information in a format of one of a document object model tree and an array.

* * * * *

UNITED STATES PATENT AND TRADEMARK OFFICE

CERTIFICATE OF CORRECTION

PATENT NO. : 6,507,856 B1
DATED : January 14, 2003
INVENTOR(S) : Chen et al.

It is certified that error appears in the above-identified patent and that said Letters Patent is hereby corrected as shown below:

<u>Title page, Item [54] and Column 1 lines 1-3,</u>
Replace title with:
-- SYSTEM FOR DYNAMICALLY EXCHANGING AND MERGING XML DOCUMENTS OVER A NETWORK --

Signed and Sealed this

Twenty-fourth Day of June, 2003

JAMES E. ROGAN
*Director of the United States Patent and Trademark Office*